(12) United States Patent
Buerkle et al.

(10) Patent No.: US 7,862,750 B2
(45) Date of Patent: Jan. 4, 2011

(54) APPARATUS AND METHOD FOR PRODUCING OPTICAL DATA CARRIERS

(75) Inventors: Erwin Buerkle, Benediktbeuem (DE); Martin Eichlseder, Tettenweis (DE)

(73) Assignee: Thomson Licensing SAS, Bologne-Billancourt (FR)

( * ) Notice: Subject to any disclaimer, the term of this patent is extended or adjusted under 35 U.S.C. 154(b) by 208 days.

(21) Appl. No.: 11/861,659

(22) Filed: Sep. 26, 2007

(65) Prior Publication Data
US 2008/0012161 A1 Jan. 17, 2008

Related U.S. Application Data

(63) Continuation of application No. PCT/EP2006/050927, filed on Feb. 14, 2006.

(30) Foreign Application Priority Data

Mar. 26, 2005 (DE) ....................... 10 2005 013 975

(51) Int. Cl.
*B29D 11/00* (2006.01)
(52) U.S. Cl. ....................... 264/1.33; 156/242; 425/116; 425/810
(58) Field of Classification Search ................ 264/1.33; 425/116, 810
See application file for complete search history.

(56) References Cited

U.S. PATENT DOCUMENTS

| | | | |
|---|---|---|---|
| 4,897,228 A * | 1/1990 | Miwa et al. | 264/478 |
| 5,008,062 A | 4/1991 | Anderson et al. | |
| 6,111,851 A | 8/2000 | Ohki et al. | |
| 2003/0179693 A1* | 9/2003 | Ootera | 369/283 |
| 2004/0090893 A1 | 5/2004 | Ootera | |
| 2004/0233830 A1 | 11/2004 | Usami et al. | |
| 2006/0007845 A1* | 1/2006 | Hoogland | 369/273 |

FOREIGN PATENT DOCUMENTS

| | | |
|---|---|---|
| DE | 19650854 C1 | 3/1998 |
| DE | 69729369 T2 | 3/1998 |

(Continued)

OTHER PUBLICATIONS

Mitzler et al.: "High-quality surface from injection moulding and reaction process machinery", in: Kunststoffe, Carl Hanser Verlag, München, Germany, vol. Oct. 2004, pp. 180-186.

*Primary Examiner*—Kat Wyrozebski
*Assistant Examiner*—Daniel Lee
(74) *Attorney, Agent, or Firm*—Henry M. Feiereisen; Ursula B. Day

(57) ABSTRACT

A device and a method are disclosed for producing an optical data medium, in particular high density optical media, such as the recently developed BlueRay™ disk for illumination with a blue laser ($\lambda \approx 405$ nm). The required thickness of the data and/or protective layers is of the order of at most several tenths of millimeters. Such thin layers are difficult to produce with conventional injection molding processes. The disclosed device and method solve this problem by overflowing an element placed in a narrow cavity with a low-viscosity material having a viscosity lower than the viscosity of polycarbonate, which then forms the data or protective layer, or by bonding a layer produced in this manner to another layer using a low-viscosity adhesive.

20 Claims, 11 Drawing Sheets

FOREIGN PATENT DOCUMENTS

| | | |
|---|---|---|
| DE | 19842899 A1 | 3/2000 |
| DE | 20112611 U1 | 1/2002 |
| DE | 10306357 A1 | 9/2004 |
| DE | 10309814 B3 | 9/2004 |
| EP | 0729141 A2 | 8/1996 |
| EP | 1102253 A1 | 5/2001 |
| EP | 1102254 A1 | 5/2001 |
| EP | 1193703 A2 | 4/2002 |
| EP | 1204108 A2 | 5/2002 |
| JP | 08-235641 | 9/1996 |
| JP | 09-180256 | 7/1997 |
| JP | 2002-251802 | 9/2002 |
| JP | 2004-342273 | 12/2004 |
| WO | WO 03/025925 | 3/2003 |
| WO | WO 03/098607 | 11/2003 |

* cited by examiner

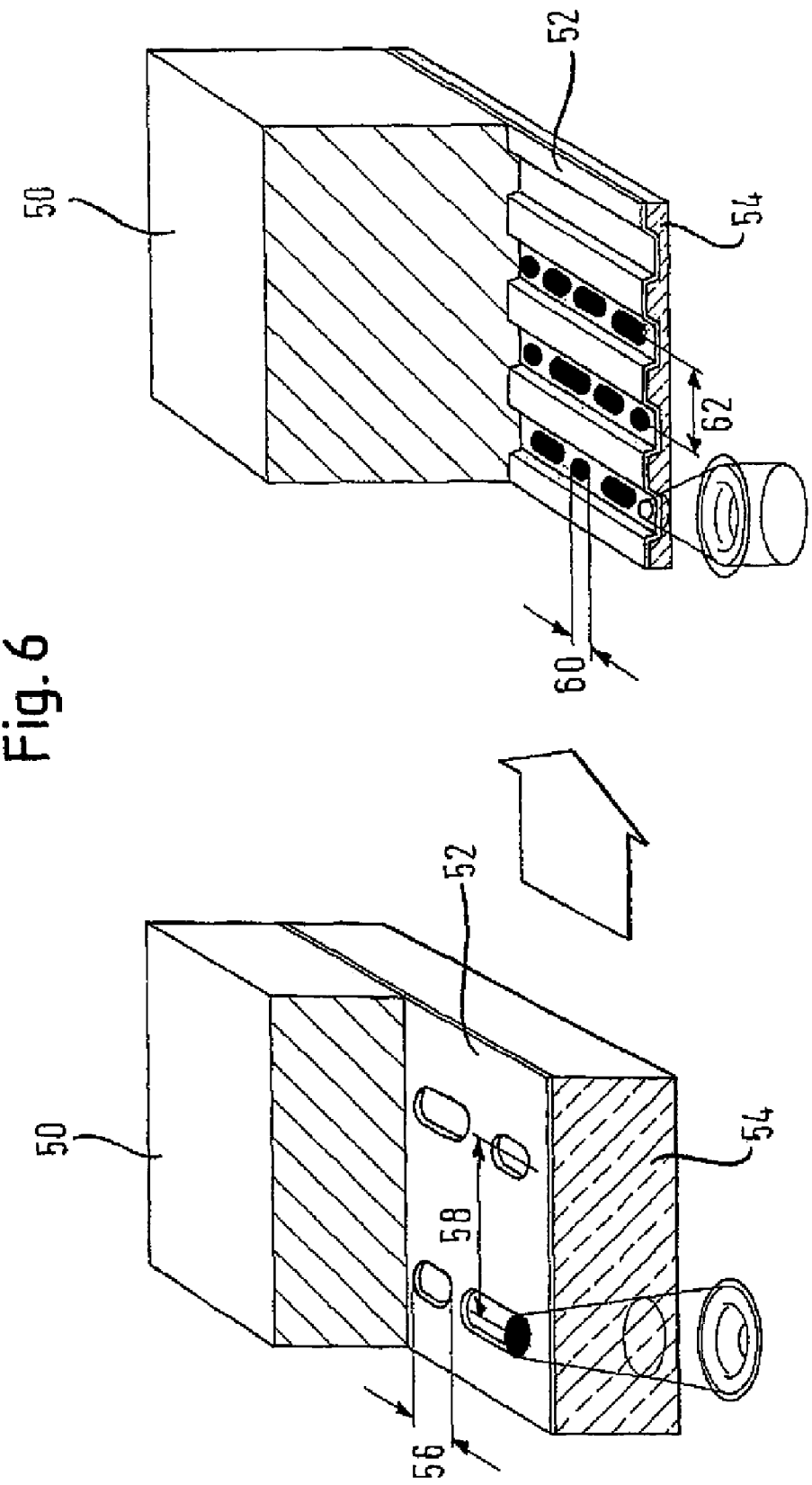

Fig. 9

| Laser | CD | DVD | Blu-ray disc |
|---|---|---|---|
| | 780 nm<br>Infrared<br>AlGaAs | 635/650 nm<br>Red<br>AlGaInP | 405 nm<br>Blue-violet<br>GaN |
| Numerical Aperture | 0,45 | 0,6 | 0,85 |
| Focusing | | | |
| REM | 1,6 µm | 0,74 µm | 0,32 µm |

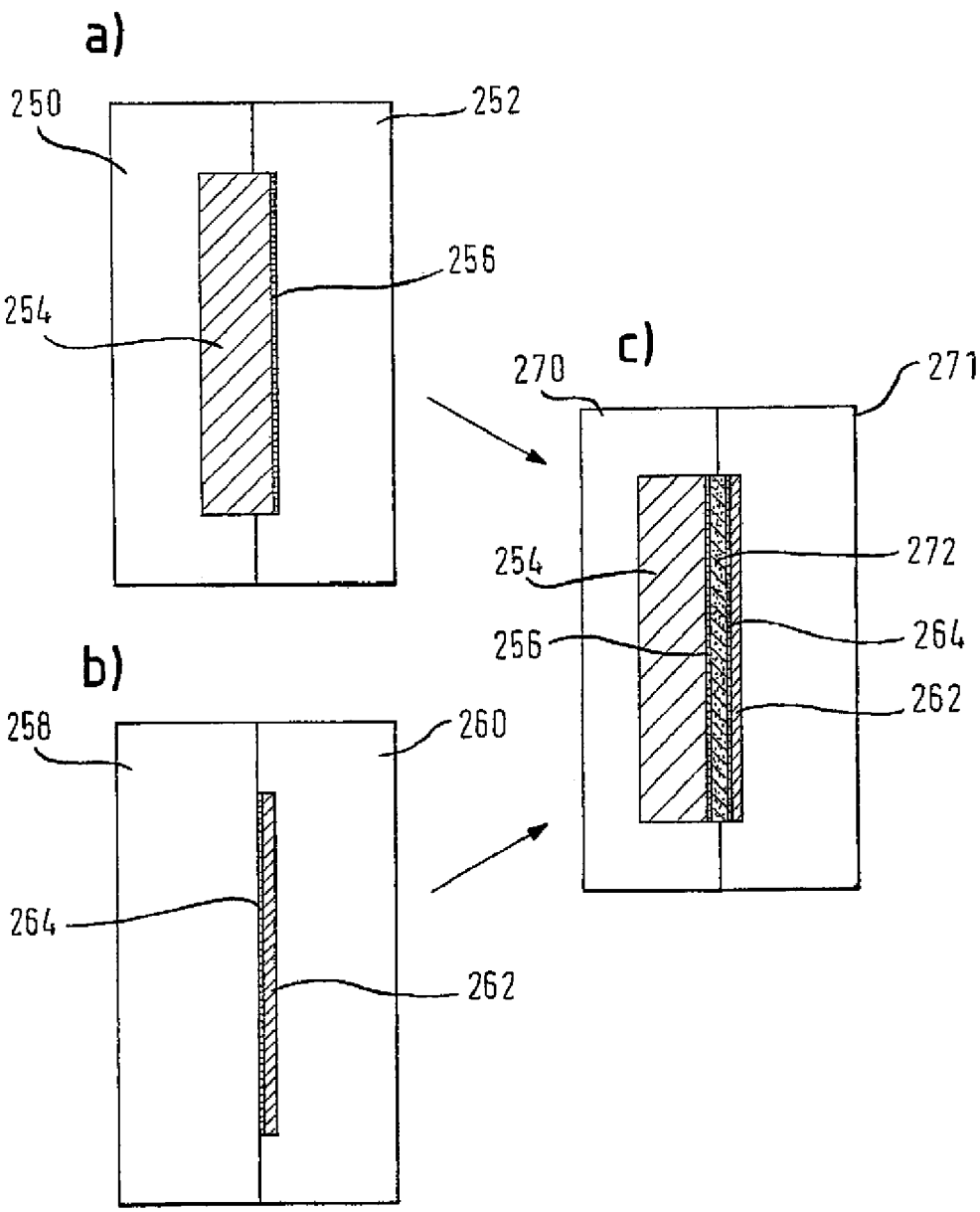

Fig. 16a  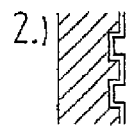 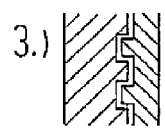
Fig. 16b 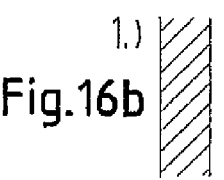 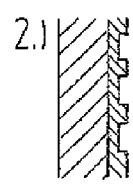 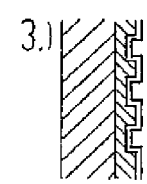 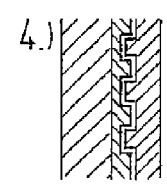
Fig. 16c 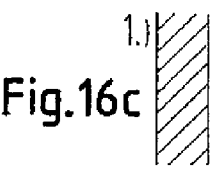 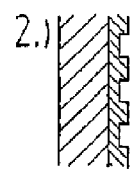 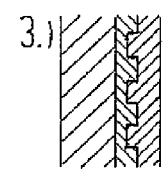
Fig. 16d 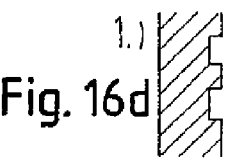 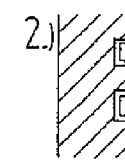 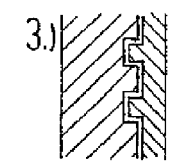
Fig. 16e 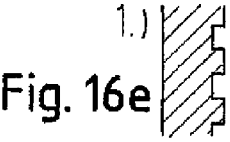 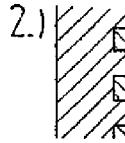
Fig. 16f 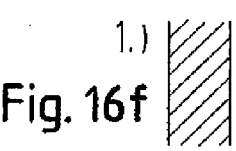 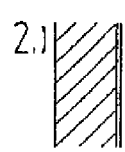 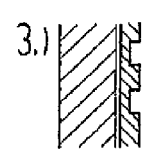 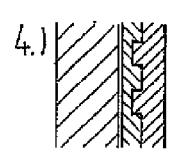
Fig. 16g  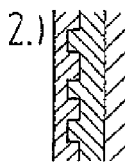 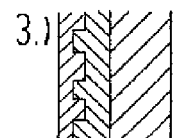

APPARATUS AND METHOD FOR PRODUCING OPTICAL DATA CARRIERS

CROSS-REFERENCES TO RELATED APPLICATIONS

This application is a continuation of prior filed PCT International application no. PCT/EP2006/050927, filed Feb. 14, 2006, which designated the United States and has been published but not in English as International Publication No. WO 2006/103140 A1 and on which priority is claimed under 35 U.S.C. §120, and which claims the priority of German Patent Application, Serial No. 10 2005 013 975.2, filed Mar. 26, 2005, pursuant to 35 U.S.C. 119(a)-(d), the contents of which are incorporated herein by reference in its entirety as if fully set forth herein.

BACKGROUND OF THE INVENTION

The present invention relates to an apparatus and a method for producing optical data carriers.

Nothing in the following discussion of the state of the art is to be construed as an admission of prior art.

Optical data carriers for storing information have become ubiquitous in our daily lives during the past years. In particular, CDs (compact disks) and DVDs (digital versatile disks) have become mass storage devices. Unlike data storage devices with short access times, which are used particularly for random-access memory of computers and the like, optical data carriers are used for mass data storage, in particular for dealing with an ever increasing amount of data.

Practical applications of optical data carriers go back to the year 1980 when the so-called "laser disk" was developed. Subsequently, in the years 1982 the audio CD was developed, in 1985 the CD-ROM, in 1988 the MO-disk (magneto-optical disk), in 1989 the CD-R, in 1994/1995 the DVD, in 1996 the CD-RW, DVD-video and DVD-ROM, in 1997-2002 the DVD audio, the DVD-R, the DVD-RAM, the DVD-RW, the DVD+RW, and the DVD+R.

Another milestone has been achieved with the final stages of the development of the so-called BluRay disk. The development of the BluRay disk was concluded in the year 2003. BluRay disk acquires its name from the employed laser which has a wavelength of 405 nm, which is in the blue spectral range. An alternatives to the BluRay disk is, for example, the "high-capacity" DVD, also referred to as blue DVD.

Audio CDs were capable of storing at most 80 minutes of music information at a sampling frequency of 44.1 kHz and with a resolution of 16 bits. The CD-ROM achieved a storage capacity of about 700 MB. The smaller structures of the DVD enabled a significant increase in the storage capacity. For example, a so-called single-side, single-layer DVD (DVD-5) stores about 4.7 GB. A double-sided, double-layer DVD attains about 17 GB.

Both CDs and the DVDs store information in a spiral groove in the form of so-called "pits" (holes) or "grooves" (for recordable optical data carriers) and "lands" (bottom region). A "pit" is referred to as a hole in relation to the reflecting layer. An information layer having "pits/grooves" and "lands" is formed so as to be fully or partially reflecting. The hole (pit) is a hereby weakly reflecting. "Land" is referred to as the area between two "pits" and is strongly reflecting. Conversely, a "bump" refers to a "pit" as viewed by the laser.

The basic operation of scanning (reading) the information on a conventional optical data carrier (CD/DVD) will be described with reference to FIG. 1. A laser diode 10 emits laser light at a certain wavelength (CD: 780 nm; DVD: 650 nm; BluRay: 405 nm). The laser light is directed by a lens 12 to a polarizing beam splitter 14, from where it propagates to a so-called $\lambda/4$ plate which rotates the polarization of the laser beam. A lens 18 focuses the beam onto the track of an optical data carrier 20. Depending if a "pit" or a "land" is encountered, the laser beam is reflected with more (land) or less (pit) intensity. The reflected laser beam is again directed through the lens 18 to the $\lambda/4$ plate where the polarization is once more rotated. By rotating the polarization, the beam splitter 14 prevents feedback to the laser diode and directs the reflected laser beam through a lens 22 onto a photodiode 24 which determines if the laser beam is retro-reflected or not. A corresponding electric signal is generated by the photodiode depending on the information on the optical data carrier 20.

The overall dimensions of a conventional CD and DVD are typically identical. As shown in FIG. 2, both optical data carriers 20 have a diameter of 120 mm, a central bore 30 of 15 mm, and an annular data region 26, wherein the width of the annular region is approximately 30 mm. However, the technical data for the CD and the DVD are different. For example, the track spacing on a CD is 1.6 µm, the pit width 0.5 µm, and the maximum pit length 3.05 µm. The reading speed of a CD is 1.2-1.4 m/s.

A DVD (e.g., single-layer, single-side DVD) has a track spacing of 0.74 µm, a pit width of 0.32 µm, a minimum pit length of 0.4 µm and a maximum pit length of 1.87 µm. The reading speeds is approximately 3.49 m/s. Additional data for the numerical aperture (NA) and the thickness (T) through which the laser beam passes are indicated in FIG. 7.

FIG. 8 shows once more on an enlarged scale the different configuration of a CD (left image) and a BluRay (BR) (right image). A CD is essentially formed of a substrate 17, with the information layer (sequence of "pits" and "lands") formed on the bottom side of the substrate 70. This side is coated with a reflecting layer 72. Thereafter, a thin protective layer, mostly in form of a clear varnish 74, is applied. A label is then typically applied on top of the clear varnish 74. The light passes through the CD from above through the substrate 70, which has a thickness of approximately 1.1 mm. The numerical aperture is 0.45. A scratch on the surface of the CD does not significantly affect the light signal.

For a BluRay disk, the cover layer through which the light passes has a thickness of only 0.1 mm. This layer is followed by the reflecting layer 72" and a support layer 74" underneath. In a BluRay disk, the light passes only through the thin upper layer of 0.1 mm, with a numerical aperture of 0.85. A scratch in the surface can adversely affect the signal quality.

FIG. 6 illustrates the difference between a DVD-5 and a BluRay. Both optical data carriers have a substrate layer 50, which for the DVD (left image) is in a range of 0.6 mm and for the BluRay in a range of about 1.1 mm. This layer 50 is followed by the information layer 52 in which the "pits" are arranged. Thereafter (in FIG. 6 below), a transparent cover and protective layer 54 is provided which for the DVD has a thickness in a range of 0.6 mm, for the BluRay however only in a range of 0.1 mm. The reference symbol 56 indicates the minimum pitch length of 0.4 µm for the DVD, the reference symbol 58 the track spacing of 0.74 µm. The reference symbol 60 indicates the minimum pit length of 0.15 µm for the BluRay, the reference symbols 62 the track spacing of 0.32 mm. Another partial cross-sectional view of a DVD is shown in FIG. 3.

Additional data formats for a DVD are illustrated in FIGS. 5a to 5d. The schematic diagram of FIG. 5a illustrates a single-layer, single-sided DVD, the diagram of FIG. 5b a single-sided, double-layer DVD, the diagram of FIG. 5c a double-sided, single-layer DVD, and the diagram of FIG. 5d a double-layer, double-sided DVD. In this context, the term "single-sided" indicates that information is applied to only one side of the DVD and can only be read from one side. The other side is a dummy side. Double-sided indicates that the information is stored on both sides of a DVD and must also be read from both sides. When playing the DVD, the DVD must be flipped over to read the information on the other side.

Single-layer indicates that information is provided on the layer on one side of a DVD (general optical data carriers). Double-layer indicates that two information layers are arranged on one side of a DVD (universal optical data carriers). In this case, the upper information layer is formed as a semi-transparent layer, so that a suitably focused laser directed onto that layer can be steered to the lower information layer and is able to also read the information from the lower layer.

To date, CDs have been produced by an injection molding process or an injection compression process. First, a die is arranged in a cavity of a mold of an injection molding machine, with the information to be transferred to the CD already provided on the die. The structures of the die are impressed onto the CD blank when the plastic material is injected into the cavity, thereby transferring the information from the die to the plastic material. The side having the structure/information is subsequently coated with a reflecting layer and varnished in a following step. The thickness of the plastic part forming the substrate is in a range of 1.1 mm for a CD so that the pit structures could be easily formed using an injection molding process. Corresponding manufacturing facilities have operated reliably throughout the years.

However, significant problems were encountered in the production of a DVD due to the smaller pit size. Moreover, the cover layer through which the laser beam passes must be made thinner, which depends in particular on the particular wavelength of the laser light and the numerical aperture. With a CD, an infrared laser with a wavelength of 780 nm is typically used, whereas a DVD employs a wavelength of about 635 to 650 nm. As a result, with a final thickness of the optical data carrier again in a range of 1.2 mm, two separate disks each having a thickness of approximately 0.6 mm had to be produced, which then had to be glued together. Manufacturing problems were already encountered in the production of the relatively thin disks of 0.6 mm because, for example, the pit geometries could not be imaged with the required accuracy when using thermoplastic material that has a relatively high viscosity in the molten state. The gluing process also has been found to be susceptive to failure. In the first years of DVD manufacturing, approximately 50% or more of the DVDs had to be discarded, because bubbles where found in the adhesive layer. Even today, the rejection rate of DVDs is in the range of 15-20%.

Additional problems were encountered in the application of the reflecting layer and/or the partially reflecting layer. The reflecting layer should faithfully reproduce the underlying pit-land structure. Depending on the coating process (e.g., with the so-called sputtering process), the coating structures were found to no longer identically reproduce the underlying pit-land structure.

The above general discussion is intended to provide a better understanding for the problems encountered in the production of the BluRay disks. With this novel optical storage medium, the transparent cover layer through which the light passes can have a thickness in the range of only 0.1 mm. In addition, the track spacing—as mentioned above—is reduced to 0.3 µm and the minimum pit length is in the range of 0.16-0.138 µm. These differences were already discussed with reference to FIGS. 7 to 9. A layer thickness of 0.1 mm is difficult to achieve using an injection molding process. Initial attempts of applying a cover layer therefore employed a spin-coating process. In this approach, a certain quantity of material for the cover layer is applied, and the data carrier is rapidly rotated, thereby uniformly distributing the material of the cover layer toward the outside by centrifugal force. However, it has been observed that the layer thickness is not completely uniform, and that a layer thickness of exactly 0.1 mm cannot be precisely attained. Additional experiments were carried out with adhesive foils; however, these experiments did not give satisfactory results.

It would therefore be desirable to provide an apparatus and a method which is able to overcome the aforementioned shortcomings by providing optical data carriers having conventional CD and DVD formats, as well as optical data carriers with information and cover thin layers and small-size information structures.

SUMMARY OF THE INVENTION

In a conventional manufacturing process, the substrates and information layers are typically injection molded from polycarbonate. Polycarbonate is a transparent thermoplastic material which is initially melted in a plasticizing unit of an injection molding machine and subsequently introduced into the cavity as a melt. However, in the manufacture of DVDs, in particular in the manufacture of BluRay disks, the layer information layers must have a thickness which is difficult to attain even in the molten state due to the high viscosity of polycarbonate. In the injection molding process, the polycarbonate in the mold cools down already during the important molding phase which adversely affects the viscosity for the molding process.

According to one aspect of the present invention, a method of making an optical data carrier for storing information includes the steps of providing information in the form of an alternating sequence of pits and lands upon a side of a reflecting or partially reflecting first information layer, placing a component of the optical data carrier with the first information layer in a cavity, and overflowing the cavity with a hardenable material having a viscosity which is lower than a viscosity of polycarbonate.

According to another aspect of the invention, a method for producing an optical data carrier for storing information, includes the steps of providing at least one information layer with an at least partially reflecting layer, wherein the information is contained in an information layer in a track having alternating sequences of "pits/grooves" and "lands", wherein preferably on the outermost information layer a light-transparent cover layer is applied, producing an information layer or cover layer in a cavity by flooding the cavity with a material having a lower viscosity than the viscosity of polycarbonate, and thereafter joining the information layer or cover layer with another component of the optical data carrier.

Alternatively, at least two information layers are formed, wherein at least one information layer is produced in a cavity by flooding the cavity with a material having a lower viscosity than the viscosity of polycarbonate, preferably polyurethane. The at least two information layers are glued together with an adhesive.

According to another aspect of the invention, an apparatus for producing an optical data carrier includes a cavity for placement of a carrier layer and an information layer or two information layers at a defined spaced-apart relationship to define an intermediate space which is sealed from a surrounding area, and a filling unit for overflowing the intermediate space with an adhesive having a viscosity which is lower than a viscosity of polycarbonate.

A precisely defined layer thickness for a layer of an optical data carrier is produced by flooding a closed cavity or by overflowing a part disposed in a closed cavity, so that not only the necessary thin information layers can be fabricated with great precision, but the pit structure can also be exactly reproduced. A material with a relatively low viscosity in a molten or liquid state can be used for flooding or overflowing, which is similar to the material used for filling. The material can cross-link or harden after filling and attains after cross-linking/hardening either a transparent or a fully or partially reflecting state. Suitable materials are particularly polyurethane materials, clear varnishes (also UV-hardenable clear varnishes) or acrylic varnishes. Solvent-based materials can also be used. The term "relatively low viscosity" in this context is meant to indicate a viscosity which is significantly lower than the viscosity of molten polycarbonate and which can easily fill a thin gap (for example, having a gap having a thickness of 0.1 mm)—optionally by applying a certain pressure.

With this technique for flooding or overflowing a cavity, optical data carriers can be produced with various processes and with different formats. A hardenable, preferably optically transparent flooding material can advantageously not only produce thin layers, but can also reproduce small structures (pits) faithfully. With this invention, problems associated with conventional thermoplastic polycarbonate material can therefore be eliminated.

The flooding or overflowing technique can be used for other processes in addition to the fabrication of particularly thin layers. It is also possible to introduce in the material used for overflowing reflective bodies, so that a completely or partially reflecting thin layer can be realized. This can potentially eliminate the separate step of applying a reflective layer by separate coating. The use of colored materials, for example materials mixed with color pigments, can be contemplated, since such materials also have a certain optical transparency or reflectivity after hardening.

Suitably, the intermediate space for flooding can also be formed between two parts to be connected. The two parts for an optical data carrier to be produced are introduced into a mold and arranged therein so that a gap with a precisely determined thickness remains between the two parts after the mold is closed. This gap can then be flooded. In this case, the filler material would serve as an adhesive after hardening. This process could be used to form a very compact and bubble-free adhesive layer. The problem of bubble formation frequently causes a high rejection rate when using conventional adhesive techniques. The rejection rate could be significantly reduced with the present invention. An adhesive layer which at the same time produces the desired the reflectivity can be easily formed by combining the gluing step with a filling step of a material, which after hardening assumes a reflecting or partially reflecting state, thus obviating the need for a separate coating.

The process technology for flooding or overflowing can be used in combination with a number of conventional systems which can be tailored to the specific requirements of particular optical formats. For example, a plastic machine with a so-called reversing plate, turntable or sliding table clamping unit can be employed. Different molding tools are arranged on the different elements of the clamping unit which in combination can produce the desired cavities. The different layers of the data carrier to be fabricated can be produced in these cavities. For example, a support layer can be produced in the first cavity. This support layer can also be formed of a conventional thermoplastic material. After hardening, the support layer is transported to another cavity in which after introduction of the support layer a thin disk-shaped cavity is formed on one side. The support layer can be overflowed by filling the thin disk-shaped cavity with a material having a low viscosity, as described above. If another conventional die (stamper) is arranged in the cavity opposite the support layer, then the information is formed on the thin layer, with this layer then forming an information layer. If this layer includes reflecting particles, then a reflecting layer is formed at the same time. The formed product can now be transported to another cavity, whereby once more a thin disk-shaped cavity is formed—in this case on the information side. An additional layer can be formed by repeated overflowing, thereby producing sequentially an optical data carrier with a layered structure with potentially very thin layers. It will be understood that the produced layer must have hardened completely or at least partially before being demolded from a cavity. In the context of the invention, the terms "die" and "stamper" will be used interchangeably.

Alternatively, the formed product can remain in one part of a molding tool, so that only the respective other molding tool part needs to be exchanged for forming another cavity. It is also possible to handle only a mold insert in which the respective layer is formed. This approach would simplify handling of the formed parts of the optical data carrier, because only a small unit needs to be removed and/or transported. In particular, when the cycle times for the different layers are different, a separately handled mold insert could potentially compensate for differences in the cycle time. This clearly illustrates how to use a clamping unit with a reversing plate, a turntable or a sliding table for production.

Depending on the production process, a colored layer may be arranged between two layers, as is customary with a recordable optical data carrier (CD-R, DVD-R). In this case, such colored layer must be applied on an information layer before further processing (overflowing, gluing).

Alternatively to the afore-described successive layer-by-layer construction attained by successive overflowing and formation of a new layer at each step, the layers can also be formed separately and subsequently glued together in a cavity in the afore-described manner. This may be accomplished, for example, by forming a first layer in a first cavity and a second, optionally very thin layer in a separate second cavity (e.g., the 0.1 mm layer for the uppermost cover layer of a BluRay disk). Both layers can then be introduced into a molding tool, wherein a small gap is formed between the two layers after closure, with the intermediate space being filled—as described above—with an adhesive. To prevent damage to the 0.1 mm thin layer, the layer can hereby remain in the part of the molding tool in which the layer was formed. This part of the molding tool then also forms a part of the later molding tool. The molding tool itself hereby operates as a handling part. The handling part can also be an insert for a molding tool which can be handled separately.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a diagram showing the different dimensions and different structure of a DVD-5 in comparison to a BluRay disk, FIG. 9 is a data comparison between CD, DVD and BluRay disks, FIG. 14 shows schematically the fabrication of a double-layer BluRay disk, FIGS. 16a-g show schematically different process flows for producing a BluRay disk.

DETAILED DESCRIPTION OF PREFERRED EMBODIMENTS

Figure 2:
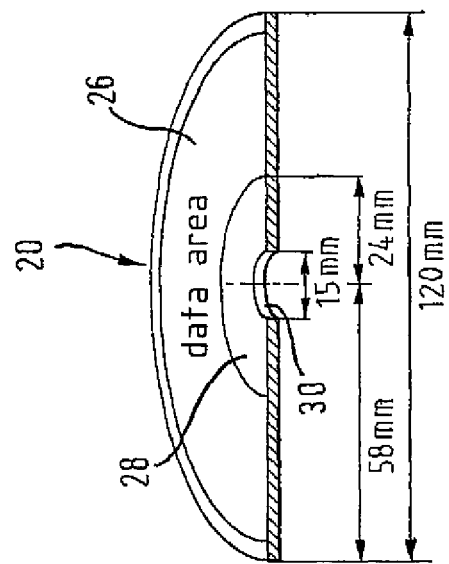
FIG. 2 is a schematic diagram of one half of an optical data carrier with dimensions.
Figure 1:
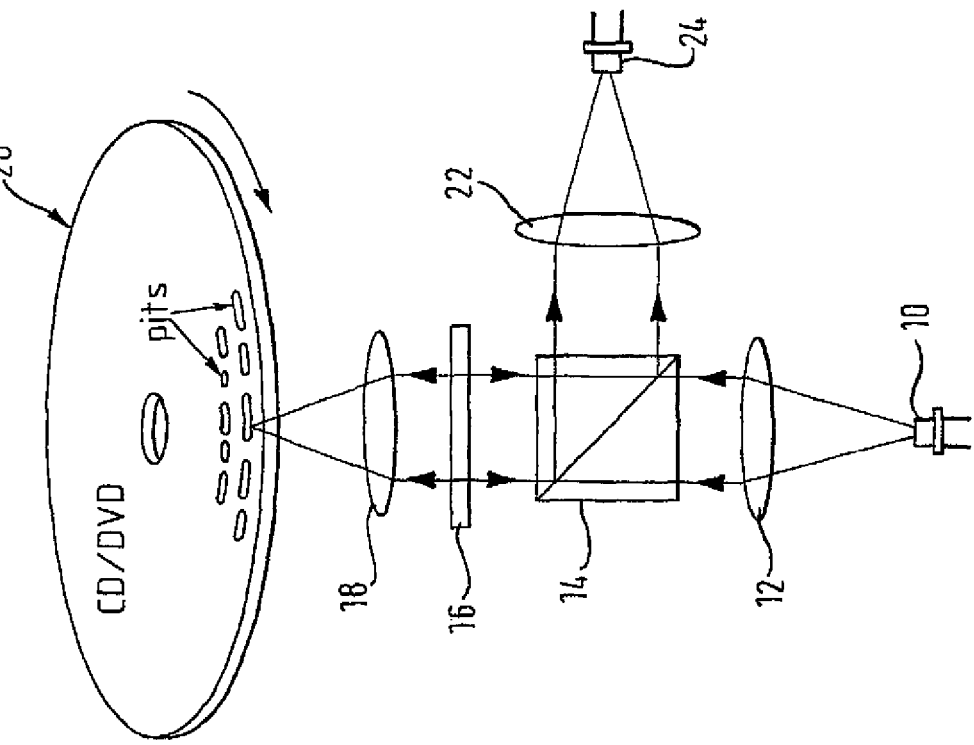
FIG. 1 is a schematic diagram of a reading device for reading information stored on an optical data carrier.
Figure 5A:
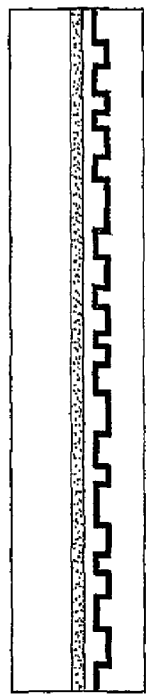
FIG. 5a is a schematic diagram of a single-side, single-layer DVD.
Figure 5B:
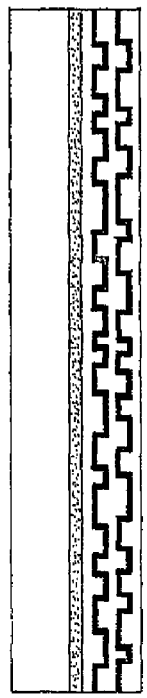
FIG. 5b is a schematic diagram of a single-side, a double-layer DVD.
Figure 5C:
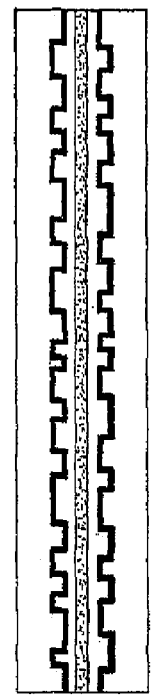
FIG. 5c is a schematic diagram of a double-sided, single-layer DVD.
Figure 5D:
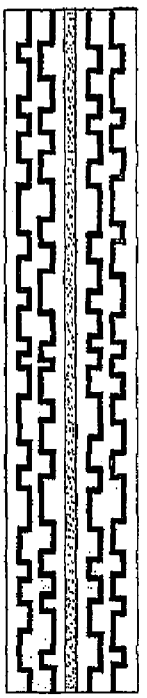
FIG. 5d is a schematic diagram of a double-sided, double-layer DVD.
Figure 3:
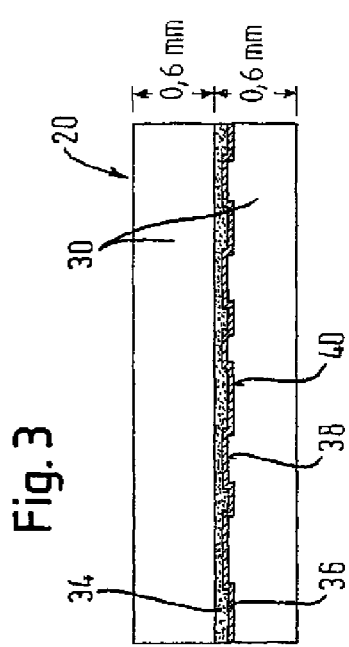
FIG. 3 illustrates a structure of a DVD-5 (single-side, single-layer)
Figure 4:
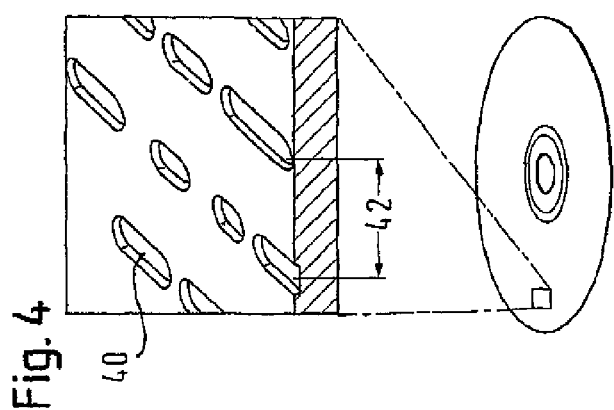
FIG. 4 is a schematic diagram of the surface of a DVD (half side)
Figures 7, 8:
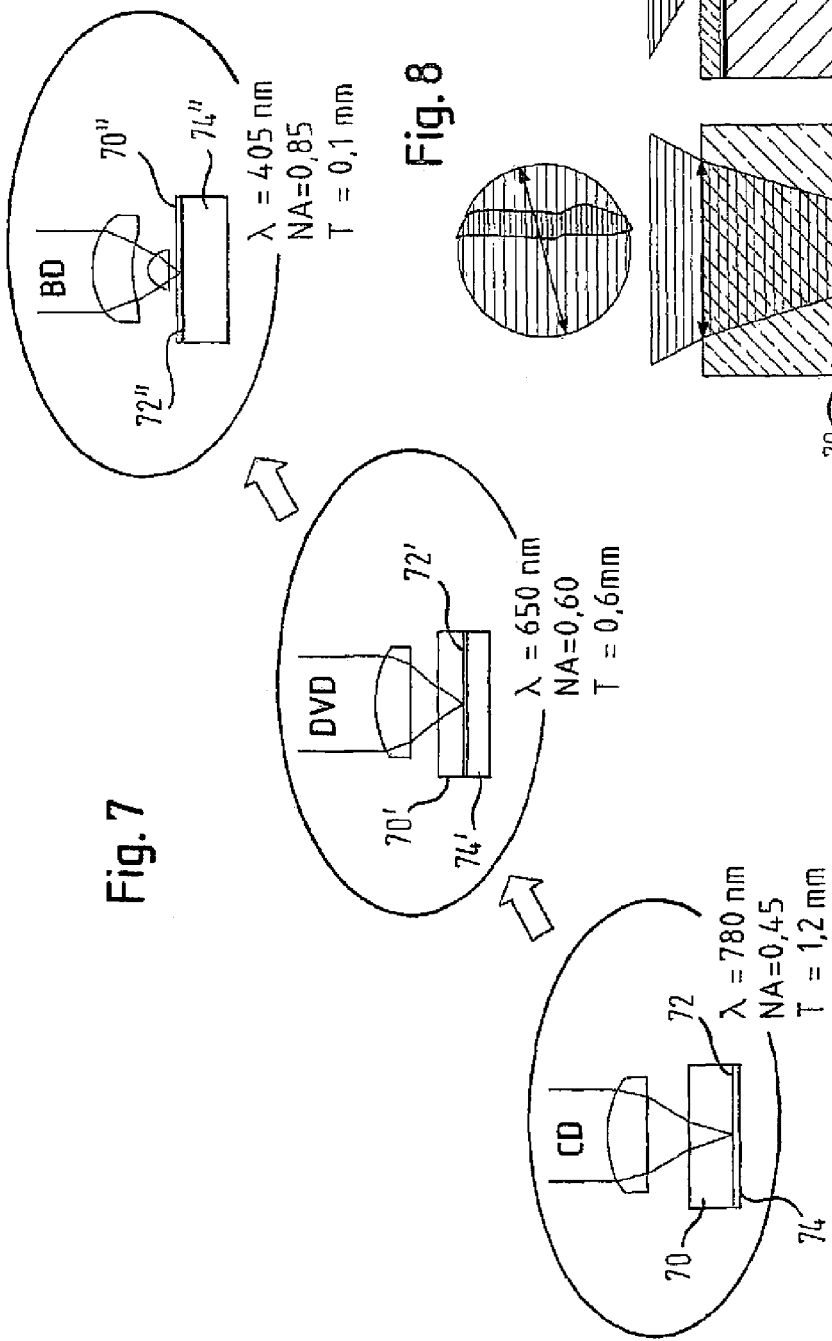
FIG. 7 is an illustration of the different data in the transition from a CD to a DVD to a BluRay disk.
FIG. 8 shows schematically the problem with potential errors in BluRay disks.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Different exemplary embodiments for producing various data carriers will now be described with reference to FIGS. 10a-10g, 12a-12b, 13a-13b, and 14a-14c. Particular reference is made to the various production methods and the different apparatuses, whereby the apparatuses do not illustrate complete facilities with injection molding units and clamping units. This is also not required for a discussion of the present invention.

As discussed above, an essential feature of the present invention is the use of a material with the lowest possible viscosity before hardening for flooding a substrate, whereby the low-viscosity material is uniformly transparent after hardening and is of high optical quality to let a laser beam pass through.

Figure 10A:
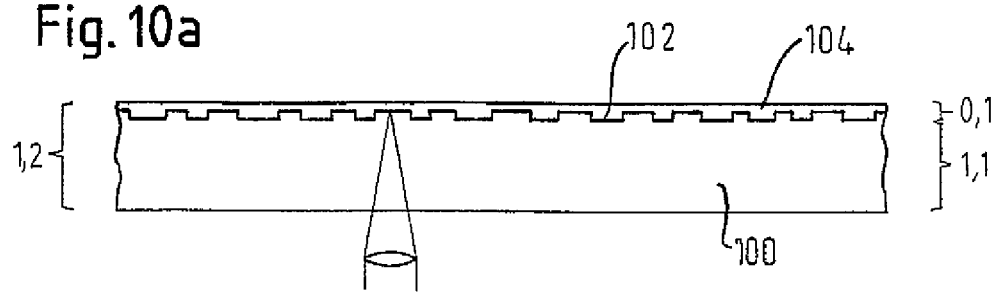
FIGS. 10a-g are highly schematic diagrams of different embodiments of optical data carriers according to the invention.

FIG. 10a shows schematically a CD having a thickness of about 1.2 mm. The CD consists in a conventional manner essentially of a substrate 100 having a thickness of 1.1 mm. In a conventional injection molding process, an information structure is applied to the substrate (shown at the top of the Figure). This information structure is then coated with a reflecting layer 102 (sputtered layer), thereby producing a corresponding reflection upon illumination with a laser beam that depends on whether a "pit" or a "land" is present. After coating with the reflecting layer 102, a protective layer of about 0.1 mm is applied, resulting in an overall thickness of 1.2 mm. The substrate layer is produced with a conventional injection molding process, wherein molten polycarbonate material is introduced into a cavity in which a die is located. If the protective layer 102 is a protective reflecting layer, then the reflecting sputtered layer 102 can be eliminated.

However, a reactive polyurethane material which is introduced into a corresponding cavity can also be selected as a substrate. If a die is arranged in that cavity, then the information is reproduced accordingly. An additional polyurethane layer or a clear varnish can be applied as a reflecting layer as well as a protective layer to the surface which has the information through overflowing. A material with reflecting particles is hereby used, thereby forming a reflecting layer 102 after hardening. The reflecting layer operates here also as the protective layer 104. The present invention would then eliminate a separate coating step for applying the reflecting surface.

Figure 10B:
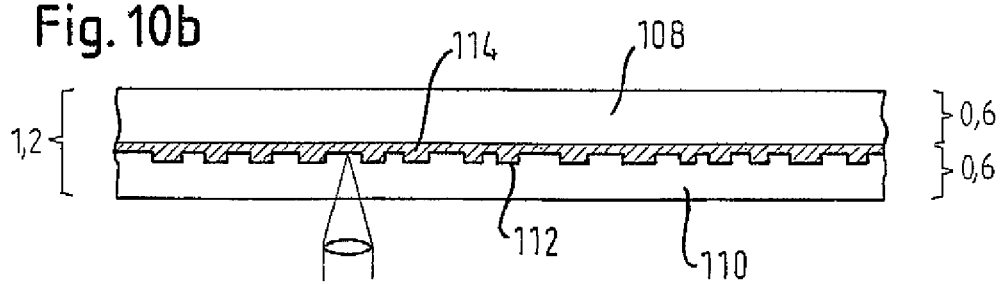

FIG. 10b illustrates another possibility for using the present invention. FIG. 10b shows a DVD-5 (single-side, single-layer). The DVD-5 has a first (shown here as an upper) layer which only has a support function and can therefore be referred to as "dummy layer" 108. Layer 108 is typically produced by injection molding and has a thickness of about 0.6 mm. However, this layer could also be produced from a polyurethane material.

The information itself is applied on this optical data carrier in form of an information layer 110 which also has a thickness of about 0.6 mm. The information layer is at the same time also a cover layer. A required scratch resistance can be attained by applying a particularly scratch-resistant layer, such as a layer developed by the company TDK (layer thickness 2 μm). This information layer 110 can also be produced in a conventional manner by a separate injection molding step. However, if this layer is also made of polyurethane, then scratch resistance is already provided, and a separate coating with a scratch-resistant layer is not required.

The two afore-described layers 108 and 110, i.e., the dummy layer 108 and the information layer 110, can be received in a mold in such a way that they are spaced in a precisely defined manner (e.g., with a gap having a width of 0.1 mm). A low-viscosity adhesive medium can be introduced into the mold which is sealed off from the environment. Suitable is not only polyurethane, but also a UV-hardenable adhesive or another solvent-based adhesive liquid. With this adhesive layer, regardless if it is formed of a UV-hardenable material or polyurethane, with reflecting particles, the otherwise necessary reflecting coating 112 can be eliminated. This not only reduces costs, but also increases the efficiency.

FIG. 10b illustrates another possibility for implementing the DVD-5. For example, the dummy layer 108 can be initially formed (by an injection molding or casting process). The dummy layer 108 can then be inserted into a cavity so as to leave a cavity gap open on one side. A polyurethane material or clear varnish adhesive is introduced into this cavity gap to overflow the dummy layer 108 and form the layer 114. A die is arranged on the side of the cavity facing the dummy layer, wherein the structure of the die is reproduced in the layer 114 after molding. After the layer 114 has hardened, the combination of dummy layer 108 and layer 114 is inserted into another cavity, where again a cavity gap remains with a dimension that corresponds precisely to that of the information layer to be produced. In this case, this information layer is formed as a cover layer because the information already resides on the surface of layer 114. The material for the layer 110 can also consist of a hardenable and highly transparent polyurethane material.

This method can be implemented in particular with modern reversing plate and turntable machines. In this context, it should be pointed out that no large mold clamping forces when using the flooding and overflowing technique, so that clamping devices with relatively small mold clamping forces can be employed.

Figure 10C:
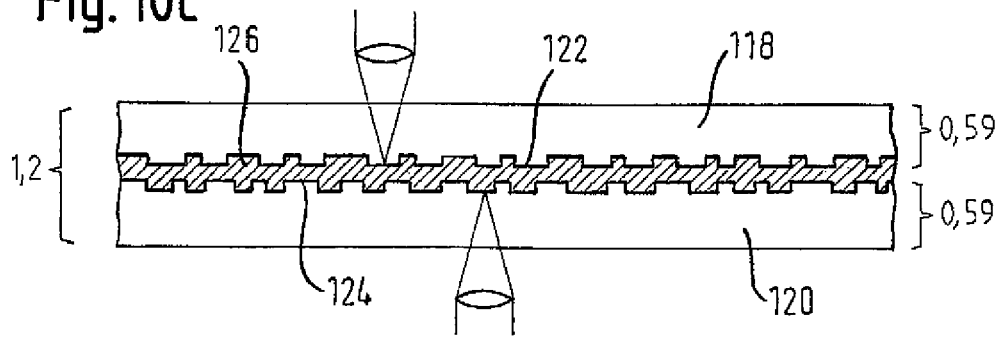

FIG. 10c shows the application of the present invention with a DVD (double-sided, single-layer). This DVD has also a total thickness of 1.2 mm and has essentially two information layers with a thickness of about 0.59 mm. Unlike the DVD-5 in FIG. 10b, the DVD in FIG. 10c now has two information layers 118 and 120 which are glued together. It should be noted that the information is read from two different sides.

The upper information layer 118 can be injection molded using a conventional polycarbonate material. This information layer can then be inserted into a cavity, whereby a cavity gap remains in which molten polyurethane material is introduced. For example, this polyurethane material can be configured to enable reflection on both sides. In addition, the surface of the second layer can be used to reproduce additional information, thus forming a second information layer. The layer 120 can also be produced through overflowing, i.e., by incorporating the combination of the first and second information layer 118 and 126, respectively, into another cavity and forming an additional cavity gap. Of course, the respective layers must at least partially harden before demolding. After fabrication of the optical data carrier, a first transparent layer 118 is present which also functions as a cover layer, and a second transparent layer 120, which also functions as a second cover layer. A reflecting layer is arranged therebetween. The information surfaces are arranged, on one hand, at the transitions between the layers 116 and 126 and, on the other hand, at the transitions between the layers 120 and 126. It is therefore difficult to define in the finished product which of the layers should be regarded as information layer. In the optical data carrier depicted in FIG. 10c, the information in the layers is read from both sides—as schematically indicated by the lenses and the laser beam.

Alternatively, the two information layers 118 and 120 can be produced by a separate injection molding process and subsequently aligned in a cavity with a defined gap/mutual separation. A reflective UV-hardenable material or a reflective polyurethane material is introduced into the gap between the two information layers 118, 120 arranged in a cavity, which then glues the two information layers 118, 120 together after hardening. Coating the respective information layer is unnecessary in both cases, because the reflecting layers 122, 124 are formed by the reflective adhesive layer 122.

Figure 10D:
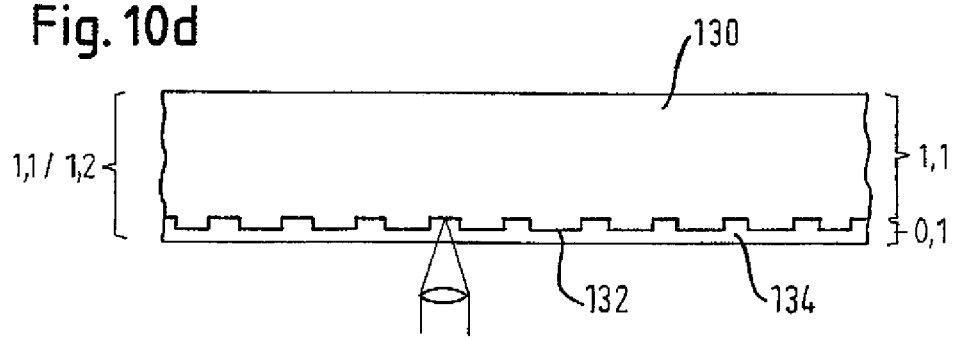

FIG. 10d illustrates another possibility for applying the present invention. This Figure shows in from of a simplified schematic diagram a modern BluRay disk having a substrate thickness of about 1.1 mm and a cover layer of about 0.1 mm. With the method of the invention, the BluRay disk can be produced in a very simple manner.

Initially, as is also done conventionally, the substrate layer 130 with the information is produced by injection molding. To this end, polycarbonate material is injected into a cavity in which a die is located. A metallic layer 132 can then be applied to the surface, for example, by sputtering. The substrate layer 130 can then be introduced into a cavity by forming a small cavity gap. The information side can then be flooded to achieve a thickness of exactly 0.1 mm as defined by the adjusted gap size. A high scratch resistance can be obtained by using polyurethane as material for the cover layer. Other materials having a low viscosity before hardening can also be used for the cover layer; these materials should be transparent after hardening and be of high optical quality with the desired index of refraction. It should be mentioned in this context that selection of the refractive index can also affect the dimension of the layer thickness, because the refractive index changes the focusing properties of the laser beam.

Because of potential problems in the production of the BluRay information structures by an injection molding process, the first step may already include filling a cavity with polyurethane (or with another material having a low viscosity before hardening) instead of an injection molding process. This would be just the inverse process of the process described with reference to FIG. 10a. A separate coating (e.g., sputtered layer) with a reflecting layer can also be eliminated by using a material for the layer 130 which is reflective after hardening.

Figure 10E:
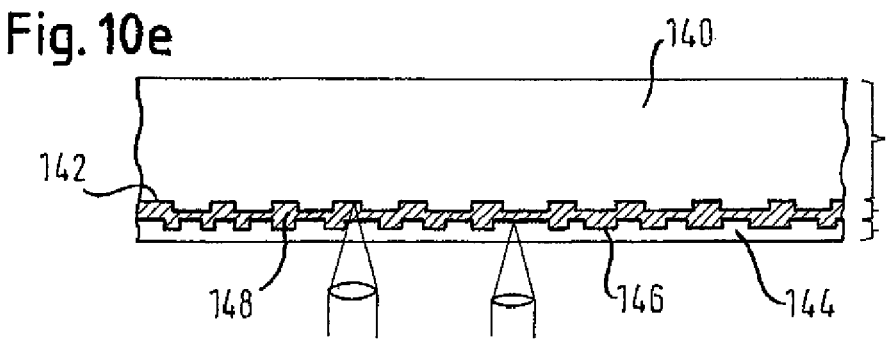
Figure 10F:
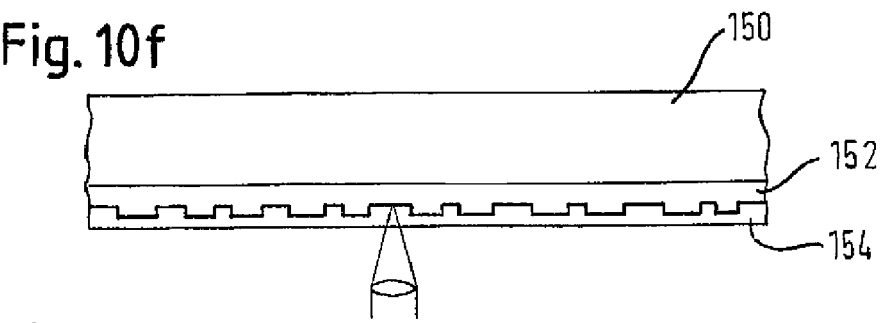

FIG. 10f describes another possibility for eliminating a separate coating process. Much like in the exemplary embodiment of FIG. 10b, the BluRay disk can be fabricated by initially producing a dummy substrate layer 150 (for example, by injection molding). This dummy substrate layer is then flooded in a cavity, in a manner described above, thus reproducing the information in a polyurethane material or a similar low-viscosity material 152, wherein this layer is configured to be reflecting after hardening. The combination of the dummy layer 150 and the reflecting layer 152 is then once more flooded in a cavity with a cover layer having a thickness of exactly 0.1 mm, thereby meeting the optical requirements.

The afore-described methods can be readily implemented in a reversing plate, a turntable or a sliding table arrangement. For example, the BluRay disk can be produced in a reversing plate machine in a cycle with three steps by inserting a label is into the cavity before the first injection molding step (in-mold-labeling), wherein the finished disk is produced after the third step. The fabrication process with a reversing plate machine will now be described.

Figure 15:
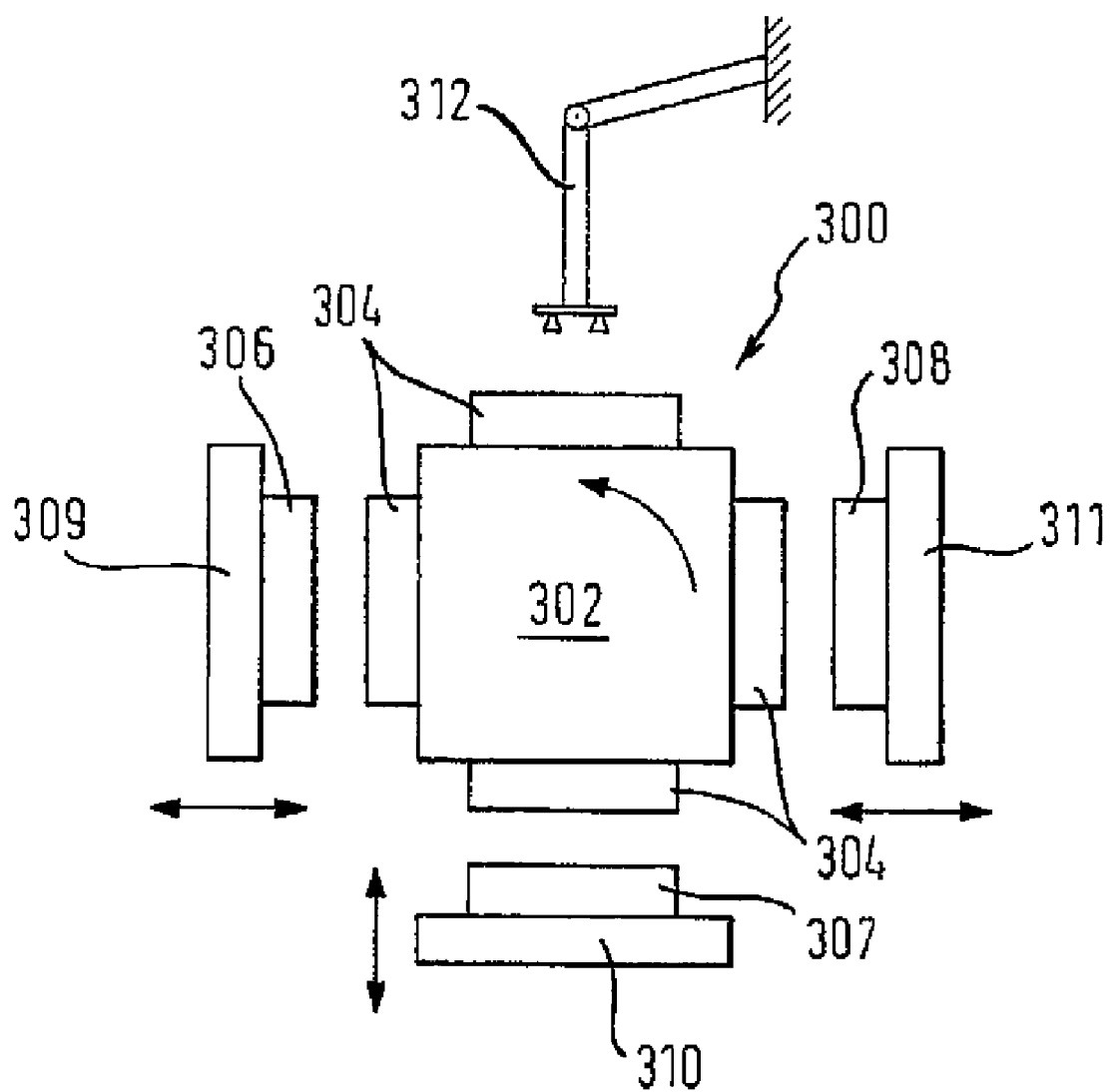
FIG. 15 illustrates schematically the use of a reversing plate clamping unit for carrying out the method of the invention.

FIG. 15 shows in a simplified schematic diagram a reversing plate clamping unit 300 (top view), wherein only the elements required for this description are illustrated. The elements not necessary for the description have been left out so as not to overly complicate the drawing. As shown in FIG. 15, the clamping unit 300 includes in the center a rotatable cube. Identically configured mold tool units 304 are arranged on the four sides of the cube. In addition, three platens 309, 310 and 311 are arranged with a mutual offset of 90°, with each platen moveable back and forth in a linear direction (see arrows). An additional mold tool unit 306, 307, and 308, which may be different, is arranged on each mold platen. A first cavity can be produced by closing the mold tool units 306 and 304; a second cavity can be produced by closing the mold tool units 307 and 304; and a third cavity can be produced by closing the mold tools units 308 and 304. A robot unit 312 is arranged opposite the platen 310 for removal. When the Blu- Ray disk according to FIG. 10f is produced—as also described above, the layer 150 is produced first, with the first cavity being closed. (The plasticizing and injection unit is not illustrated). A label is inserted before the first cavity is closed. After the first cavity is closed, a molten polycarbonate material or a polyurethane material is injected. After the layer 150 has hardened, the first cavity is opened, with the layer 150 remaining in the mold tool unit 304 and being demolded only from the mold tool unit 306. Thereafter, the cube is rotated counterclockwise by an unillustrated drive by 90° (in FIG. 15). A second cavity, in which the layer 150 is received, is formed by closing the mold tool unit 307. In this step, the afore-described thin cavity gap is formed. A die (not shown) is also inserted in the mold tool unit 307. The layer 152 can be produced by overflowing the layer 150 through filling/pouring a polyurethane material containing reflecting particles. After the layer 152 has hardened, the second cavity is opened, with the combination of layer 150 flooded with the layer 152 remaining in the molding tool unit 304 and being demolded only from the mold tool unit 307. The cube is then again rotated counterclockwise by 90° with the drive. A third cavity is formed by closing the mold tool unit 308, in which the layer 154 is formed, by overflowing the layer 152 with a UV-hardenable clear varnish or a polyurethane material After the layer has hardened, the tool is opened and the cube 302 is subsequently again rotated by 90°. The completed BluRay disk is now removed with the robot arm 312. It will be understood that all processing steps in the first, second and third cavity, as well as removal by the robot arm, can be carried out simultaneously, so that after each 90° rotation a process step is performed on each side of the cube and a completed disk can be removed after each 90° rotation. Compared with a conventional DVD facility, this arrangement eliminates not only the coating unit for the reflecting layer, but also the entire finishing unit, including the bonding station.

Compared to the process described with reference to FIG. 15, this process can eliminate a cavity in that the tool is opened by 0.1 mm after the first overflowing step and a second overflowing step is performed. However, a pit structure would then also be reproduced on the surface. This pit structure could then be "filled in" later with a varnish. The optical properties of the uppermost varnish layer and the layer underneath should be matched as closely as possible, so as not to cause disturbances from the unintentionally reproduced pit structure.

The present invention can also be used to produce a double-layer BluRay disk to be developed in the future, as illustrated in FIG. 10e. For example, a substrate layer 140 can be injection molded using a thermoplastic material or can be produced using a PUR material.

An information layer 144 can also be produced separately, for example in a dedicated cavity, from a clear varnish or a polyurethane material. Both parts can then be placed in another cavity with a predetermined mutual spacing and, for example, held in place by vacuum. The space between the two layers 140 and 144 is filled with an adhesive. The layer 140 is then optically totally reflecting, the layer 148 partially reflecting, so that laser reflections occur at the transitions 142 and 146.

Layers with a thickness in the range of 0.1 mm have proven to be difficult to handle. As will be described in more detail with reference to FIG. 14, a thin layer that is produced separately should advantageously remain in its respective molding tool until the entire product has been completed.

Figure 10G:
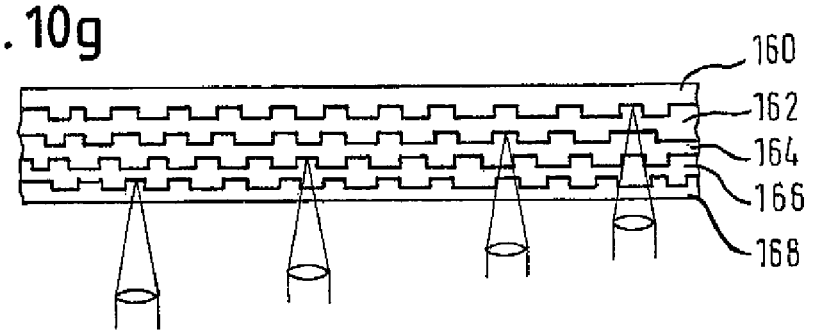

FIG. 10g illustrates a potential future application of the invention, where four information-carrying layers 160, 162, 164, 166 are superimposed. Each layer is added incrementally in a production step. The first information layer 160 is initially formed in a cavity. The first information layer 160 can then be converted in another cavity through flooding with a low-viscosity material, for example polyurethane, into a disk having a second information layer. An additional information layer 164 can be formed by placing this intermediate product into another cavity, and the fourth information layer 166 can be formed by again overflowing the unit in another cavity. It will be understood that the last-formed layer should at least be partially hardened before demolding and additional flooding. The last information layer 166 is then once more flooded with a clear varnish or a transparent polyurethane.

When a new information layer is formed, a die with corresponding information content must be placed in the respective cavity, so that the surface structure is faithfully reproduced in the new information layer. It should also be noted that the inner information layers 162 to 166 must be semi-transparent to allow focusing onto the layer below. This can be achieved by coating each information layer after that layer has been formed, wherein the first information layer can be formed to operate as a mirror, thus obviating the need for an additional reflecting layer between layer 160 and the information layer 162. Alternatively, each inner information layer can also be designed to be partially reflecting after hardening.

This example (FIG. 10g) illustrates the possibilities provided by the present invention for producing step-by-step a high-quality optical data carrier through overflowing in defined cavities. The multilayer BluRay disk illustrated in FIG. 10g can attain a storage capacity of 100 GB.

Figure 11A:
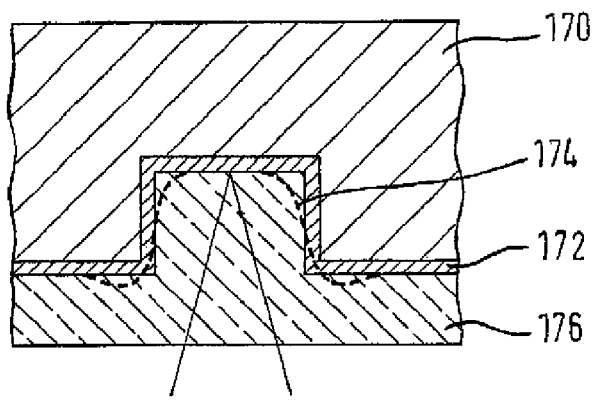
FIGS. 11a-b show schematically the problem associated with application of a sputtered layer and its solution.

FIG. 11a illustrates a potential problem. To attain a reflecting layer, a substrate 170 is conventionally coated by a sputtering process. Ideally, the sputtered layer should exactly reproduce the geometry of the structure formed in the substrate, in particular, when the reading process is performed as illustrated in FIG. 11a (see schematic diagram with the focused laser beam). A desirable ideal layer is indicated with the reference symbol 172. Such layer, however, is usually not attained, in particular not with very small structures. Instead, a layer 174 is formed, as shown by the dotted line. This effect, which is more pronounced in smaller structures, can cause particular problems with a BluRay disk having a pit size of about 0.15 µm.

Figure 11B:
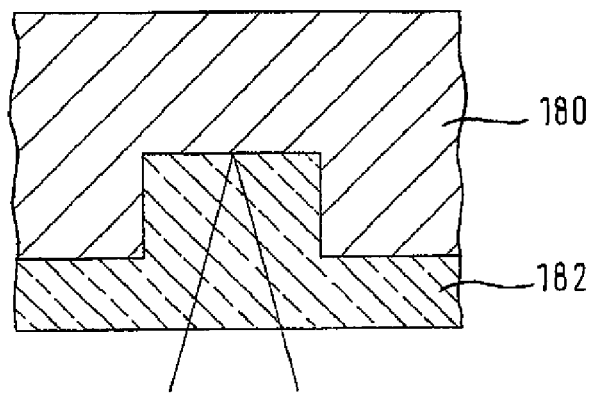

The disadvantages associated with an imprecise reproduction of the geometry can be eliminated by forming a layer itself as a reflecting layer—as described above with reference to several examples and illustrated once more in FIG. 11b in detail. In this case, the reflecting interface corresponds geometrically exactly to the layer boundary. This solves in a simple manner the problem of an imprecise reproduction of the geometry. It also eliminates the investment required for a sputtering system and an additional process step.

While FIGS. 10a to 10g show possible applications of the present invention for different optical data carriers, namely a CD (FIG. 10a), a DVD (FIG. 10b), a double-sided DVD (FIG. 10c), a BluRay (FIG. 10d), a double-layer BluRay (FIG. 10e), etc., FIGS. 16a to 16g illustrate possible applications of the present invention for a simple BluRay disk.

FIG. 16a illustrates a process in which, in a first step, a first layer is produced in a conventional manner by an injection compression process using a thermoplastic material, with the data structures being reproduced on the surface. In a second step, the surface with the data structure is coated with a reflecting layer by a sputtering process. In a third step, the transparent (active) readout layer is formed by a PUR over-flowing process, as previously described.

In the process illustrated in FIG. 16b, a dummy layer is produced in a first step in an injection molding or injection compression step, which subsequently only has a support function. In a second step, an information layer is applied by flooding the dummy layer with a PUR material, whereby the data structure is reproduced on the surface. In a third step, a reflecting layer is again applied on this surface by a sputtering process. In a fourth step, an active readout layer is applied by an overflowing process, similar to the process of FIG. 16*a*.

The process illustrated in FIG. 16*c* is similar to that of FIG. 16*b*, with the only difference residing in the overflowing of the dummy layer in the second step with a PUR material which becomes totally reflecting after hardening. This eliminates the coating step for a reflecting layer.

The process illustrated in FIG. 16*d* corresponds to that depicted in FIG. 16*a*, with the difference residing in the production of the first layer already in the first step by an injection molding process from a PUR material.

Compared to the method illustrated in FIG. 16*d*, the method of FIG. 16*e* eliminates the coating step with a reflecting layer. In the first step of the method illustrated in FIG. 16*e*, the first layer is already formed as a reflecting layer, so that only the active readout layer has to be applied by a overflowing process in step two.

In the process depicted in FIG. 16*f*, a transparent dummy layer is initially produced with an injection molding or injection compression process using a thermoplastic material. In step 2, a label is applied by reverse printing, which can be viewed through the transparent dummy layer. The information layer is produced in step three by overflowing the reverse print, wherein the information structures are formed on the surface. This information layer is then flooded in step 4 with a PUR layer to form the active readout side.

Unlike with the methods depicted in FIGS. 16*a* to 16*f*, where the optical data carrier is built up layer-by-layer, with the method shown in FIG. 16*g* a layer is initially formed in step 1 which subsequently forms the transparent and active readout layer. The information structure is already formed in this readout layer. A dummy layer is separately produced which is then positioned with a spacing (step 2) to the first layer. The thereby produced gap is then flooded with a reflecting PUR material, whereby the two outer layers are joined with one another.

It will be understood that the process steps illustrated in FIGS. 16*a* to 16*g* can be combined in any manner to produce other optical data carriers, for example to produce optical data carriers with several information layers. In this context, the combination of different materials, for example different PUR layers is of interest, which may combine different properties, such as refractive index, color, reflection, transparency, for example, to improve the reflection or focusing of a laser, which is of particular interest, for example, for a multilayer structure of information layers.

Simplified process sequences (like those already described with reference to FIG. 15) will now be described in the following FIGS. 12-14, so as to provide a better understanding of the fabrication process for the optical data carriers described with reference to FIGS. 10*a* to 10*g*.

Figure 12A:
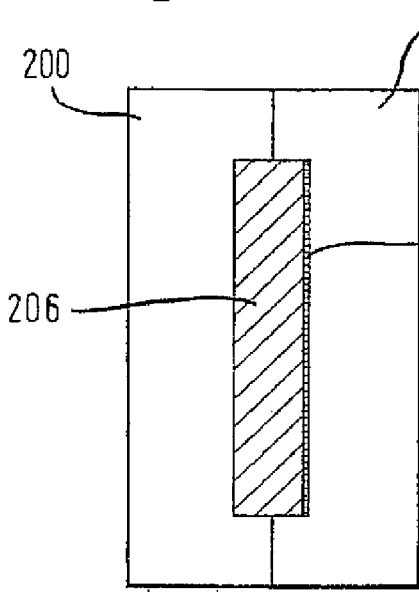
FIGS. 12a-b show schematically the fabrication step of a BluRay disk according to a first production method.
Figure 12B:
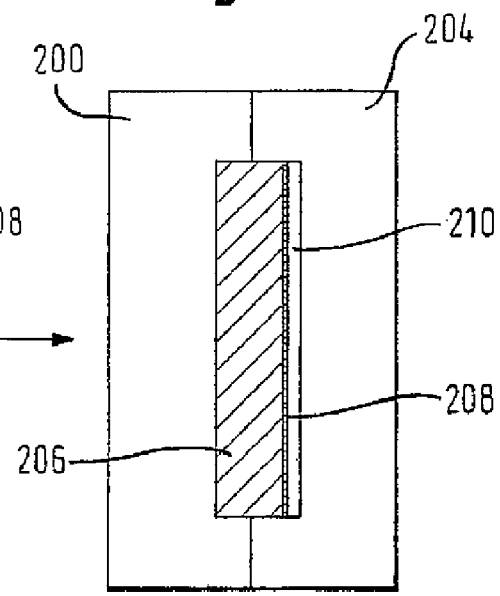

The fabrication of a BluRay disk will now be described with reference to FIGS. 12*a* to 12*b*. A die 208, which represents a master with the information to be applied to the data carrier, is inserted into a mold consisting of the mold halves 200 and 202. When the tool is closed, as shown in FIG. 12*a*, for example, a polycarbonate material is injected, forming the information structure on the right surface. After the polycarbonate material 206 has hardened, the mold is opened and another mold half 204 is applied which forms a narrow gap 210 with a thickness of 0.1 mm adjacent to the information surface. The gap 210 can now be flooded with a clear varnish or a polyurethane material. After overflowing and hardening, the disk can be removed from this mold. FIGS. 12*a* and 12*b* do not show the necessary coating of the information surface 208 with a reflecting layer, which can be applied in a conventional manner by sputtering. Alternatively, the layer 206 can already be designed to be reflecting, thereby eliminating a separate coating step.

Figure 13A:
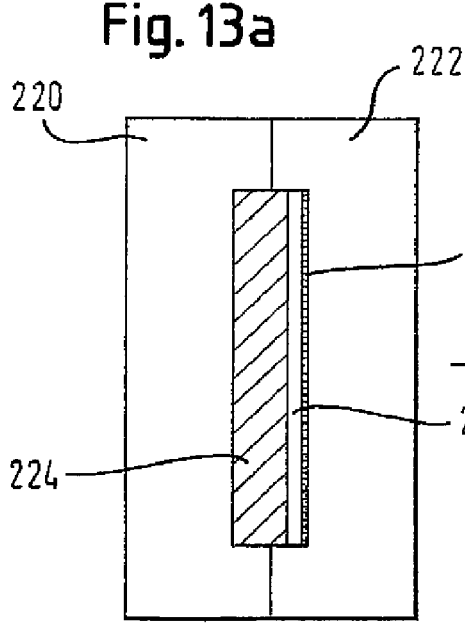
FIGS. 13a-b show schematically the fabrication step of a BluRay disk according to another production method.
Figure 13B:
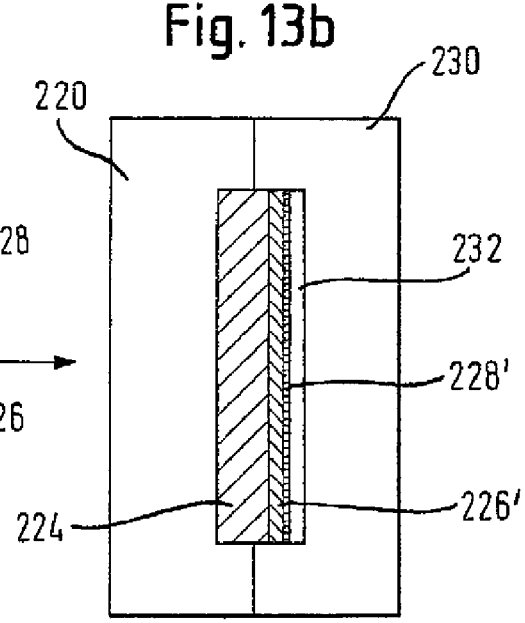

Another alternative approach for eliminating an additional coating step is illustrated in FIGS. 13*a* and 13*b*. A separately fabricated dummy layer 224 is inserted into a mold tool with the mold halves 220 and 222. An unobstructed cavity region 226 is formed as a narrow gap between the right surface of the dummy layer 224 and the mold 222, in which a low-viscosity material, which is reflecting in the hardened state, is introduced to reproduce the information stored on the die 228, with the material overflowing the dummy 224. The structure of the die 228 is thereby reproduced on this layer.

In FIG. 13*b*, the mold half 222 is replaced with another mold half 230, whereby an additional cavity gap 232 is formed to the right of the reflecting information layer 226'. This cavity gap can be filled with a material which in the hardened state is transparent to the laser beam down to the information layer 226' or its surface 228', respectively. By using suitably sized mold tool halves 220 and 230, the cavity gap 232 can be adjusted exactly to a thickness of 0.1 mm, so that the optical data carrier—in this example the BluRay—can be precisely formed.

Another fabrication process, here for a BluRay with a dual data carrier layer, is illustrated in FIGS. 14*a*-14*c*. FIG. 14*a* shows a thicker information layer 252, like the one described above with reference to FIG. 12*a*. At first, a substrate layer is formed in a mold consisting of the two mold halves 250 and 252, into which the corresponding information is stamped using a die 256.

In parallel and separately, an information layer with a thickness of 0.1 mm is formed in a separate mold, consisting of the mold halves 258 and 260, by introducing a suitable material having a low viscosity before hardening, which likewise has stamped information 264 on the left side. These two layers 254 and 262 are now arranged in another mold with a defined spacing therebetween. This additional mold also includes the mold halves 270 and 271, which advantageously are identical, so that the 0.1 mm thin layer need not be removed from the mold. After the two mold halves 270 and 271 are closed, the two information layers have a defined spacing therebetween. A low-viscosity adhesive, which may be a partially reflecting polyurethane material or another part of a hardenable layer which is partially reflecting in the hardened state, may then be filled in this cavity volume, which is sealed from the environment. By making the first layer 254 totally reflecting, the completed double-layer BluRay disk can be removed, without requiring additional finishing steps.

Various other production methods can be employed. For example, in the process step shown in FIG. 12, a label can be inserted in the mold before the substrate layer 206 is produced, which is thereafter back injection-molded. With this approach, the completed (also coated) disk could be removed from the mold after the last layer is finished, without requiring additional printing.

However, the label need not necessarily be applied to the surface, because a mirror image of the label (also in form of a hologram) could be printed on the right side of the substrate layer 224 (in FIG. 13*a*), whereby the substrate 224 itself is transparent. The additional layers 226' and the cover layer could then be disposed on the printed label, as described above. The effect would be much like through-the-glass painting, whereby the label is visible through the transparent substrate. This approach also eliminates a later printing step.

All presently known and even future optical data carriers can be readily produced with high-quality with the flooding or overflowing technique, wherein layers are flooded in a cavity with a certain thickness or thin layers are separately formed and then glued together in a cavity. Additional steps (sputtering) presently deemed necessary may be eliminated, resulting in cost savings by eliminating finishing devices and also increasing the production efficiency.

The present invention provides a number of possibilities for producing conventional and novel data carriers.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated

What is claimed is:

1. A method of making an optical data carrier for storing information, comprising the steps of:
    providing information in the form of an alternating sequence of pits and lands upon a side of a reflecting or partially reflecting first information layer;
    placing a disk-shaped component of the optical data carrier with the first information layer in a cavity, wherein a diameter of the cavity corresponds to a diameter of said disk-shaped component, and wherein a height of the cavity is greater than a height of said disk-shaped component so that a gap of a defined thickness is formed; and
    overflowing the gap with a low-viscosity hardenable material,
    wherein the low-viscosity hardenable material is a material selected from the group consisting of polyurethane material, acrylic varnish, clear varnish, and solvent-based material.

2. The method of claim 1, wherein the disk-shaped component of the optical data carrier is selected from the group consisting of substrate, one or more information layers, and substrate and information layers.

3. The method of claim 1, further comprising the step of applying a light-transparent cover layer upon the information layer.

4. The method of claim 3, wherein the information layer or cover layer has a thickness in a range from 0.1 mm to 0.6 mm.

5. The method of claim 3, further comprising the steps of molding a substrate, and gluing a member selected from the group consisting of information layer and cover layer, and the substrate to one another directly or indirectly with an adhesive.

6. The method of claim 5, wherein the adhesive is a material selected from the group consisting of UV-hardenable adhesive, polyurethane material, acrylic varnish, clear varnish, and solvent-based material.

7. The method of claim 5, wherein the adhesive is configured to be optically transparent, reflecting or partially reflecting after hardening.

8. The method of claim 5, further comprising the step of successively applying a plurality of information layers or cover layers onto the substrate.

9. The method of claim 5, wherein at least one member selected from the group consisting of information layer, substrate, and adhesive is colored or thoroughly dyed, or provided with color pigments.

10. The method of claim 5, further comprising the step of applying a colored layer between at least two layers selected from substrate, information layer and adhesive, when the optical data carrier is a writable optical data carrier.

11. The method of claim 5, further comprising the step of sputtering a coating between at least two layers selected from substrate, information layer and adhesive before joining the two layers.

12. The method of claim 3, wherein the cover layer is made of light-transparent polyurethane material.

13. The method of claim 1, wherein the substrate and the information layer are placed and held in the cavity in a defined spaced-apart relationship to define an intermediate space therebetween, and further comprising the step of filling the intermediate space with hardenable adhesive.

14. The method of claim 13, further comprising the steps of sealing the intermediate space from a surrounding area to prevent the adhesive from escaping to thereby allow formation of an intermediate layer.

15. The method of claim 1, further comprising the step of gluing at least a second information layer upon the first information layer with an adhesive.

16. The method of claim 15, wherein the first and second information layers are placed and held in the cavity in a defined spaced-apart relationship to define an intermediate space therebetween, and further comprising the step of filling the intermediate space with hardenable adhesive.

17. A method of making an optical data carrier for storing information, comprising the steps of:
    forming a disk-shaped member selected from the group consisting of substrate and information layer in a first cavity;
    transferring the disk-shaped member into a second cavity, wherein a diameter of the second cavity corresponds to a diameter of the disk-shaped member, and wherein a height of the second cavity is greater than a height of the disk-shaped member, so that a gap of a defined thickness is formed at least on one side of the disk-shaped member; and
    overflowing the disk-shaped member by introducing a low-viscosity material into the gap of the second cavity,
    wherein the low-viscosity hardenable material is a material selected from the group consisting of polyurethane material, acrylic varnish, clear varnish, and solvent-based material.

18. The method of claim 17, wherein the transferring step includes the step of demolding the disk-shaped member at least partially from a molding tool before being positioned in the second cavity.

19. The method of claim 17, further comprising the step of arranging a die containing information in confronting relationship to the disk-shaped member to thereby form the information layer as the low-viscosity material is introduced.

20. The method of claim 17, further comprising the step of placing a label into the first cavity before the forming step, wherein the forming step includes the step of filling a melted polycarbonate or polyurethane material into the first cavity.

* * * * *